United States Patent [19]

Bowers

[11] 3,947,958

[45] Apr. 6, 1976

[54] ELECTRICAL FITTING PREPARATION

[75] Inventor: William A. Bowers, Roselle, Ill.

[73] Assignee: Precision Paper Tube Company, Wheeling, Ill.

[22] Filed: Oct. 11, 1974

[21] Appl. No.: 513,954

[52] U.S. Cl. ................ 29/629; 29/203 D; 29/630 R; 29/DIG. 23; 83/277; 83/465

[51] Int. Cl.$^2$ .......................................... H02G 15/00

[58] Field of Search...... 29/628, 629, 630 R, 630 A, 29/203 D, 203 DT, 203 DS, DIG. 23, 203 P, 203 S, 630 D, 630 B; 72/703; 10/43, 44, 54; 83/277, 465

[56] References Cited

UNITED STATES PATENTS

| | | | |
|---|---|---|---|
| 2,366,459 | 1/1945 | Rosa | 29/DIG. 23 |
| 3,180,189 | 4/1965 | Lindsley et al. | 29/203 D |
| 3,234,572 | 2/1966 | Roser | 10/54 |
| 3,267,556 | 8/1966 | Scharf | 29/203 DT |
| 3,533,051 | 10/1970 | Ziegler | 339/177 R |
| 3,601,003 | 8/1971 | Guyot | 83/465 |
| 3,654,793 | 4/1972 | Ziegler et al. | 72/703 |
| 3,857,313 | 12/1974 | Endo | 83/277 |

*Primary Examiner*—C. W. Lanham
*Assistant Examiner*—James R. Duzan
*Attorney, Agent, or Firm*—Dawson, Tilton, Fallon & Lungmus

[57] ABSTRACT

A method of preparing an electrical fitting wherein a knurled wire is inserted into a molded plastic part to provide reliable anchoring of the wire as a lead for a coil form or the like.

2 Claims, 9 Drawing Figures

ELECTRICAL FITTING PREPARATION

BACKGROUND AND SUMMARY OF INVENTION

The problem to which the instant invention addresses itself is that of the reliable, yet inexpensive mounting of leads on molded forms, useful in electrical equipment. For example, millions of coil forms are used each year and reliable mass production techniques are needed. Many of the fittings to which the invention is addressed are very small and the leads correspondingly short. In many cases, a high degree of geometrical precision is needed for the installation of the lead. In the past, a wide variety of lugs have been used for leads and this has caused problems in handling — generally involving complicated equipment. On the other hand, cylindrical wire leads, although in many instances being simpler to handle, have become deformed during the installation process, necessitating down-time of a production line and, more importantly, expensive and complicated equipment.

What the invention provides is the use of a wire which is inserted into a previously provided hole in a molded plastic fitting but overcomes the drawbacks of the prior art inserting techniques because it provides control over the wire in just the portion that will be received in the hole — by slightly deforming the same — and the deformation thereby gives a more reliable anchor. In the preferred form of the invention, the wire is continuous and advances over a single path, fully under control against deformation until the wire free end (advantageously knurled) is seated within the hole in the molded plastic fitting.

Other objects and advantages of the invention may be seen in the details of the ensuing specification.

DETAILED DESCRIPTION OF INVENTION

The invention is described in conjunction with an illustrative embodiment in the accompanying drawings, in which FIG. 1 is a perspective view of apparatus advantageously used in the practice of the invention;

Figure 2:
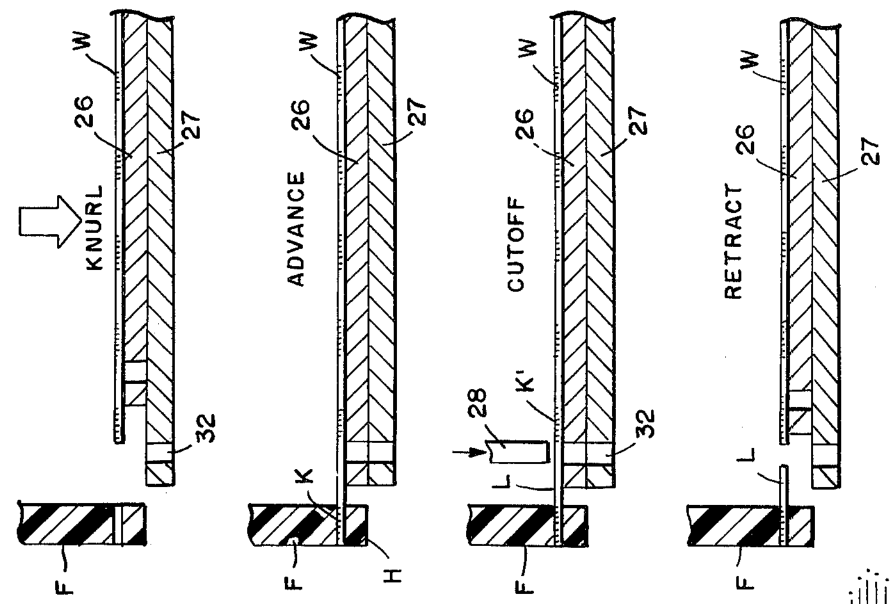
FIG. 2 is a schematic representation of the steps employed in the practice of the inventive method.
Figure 1:
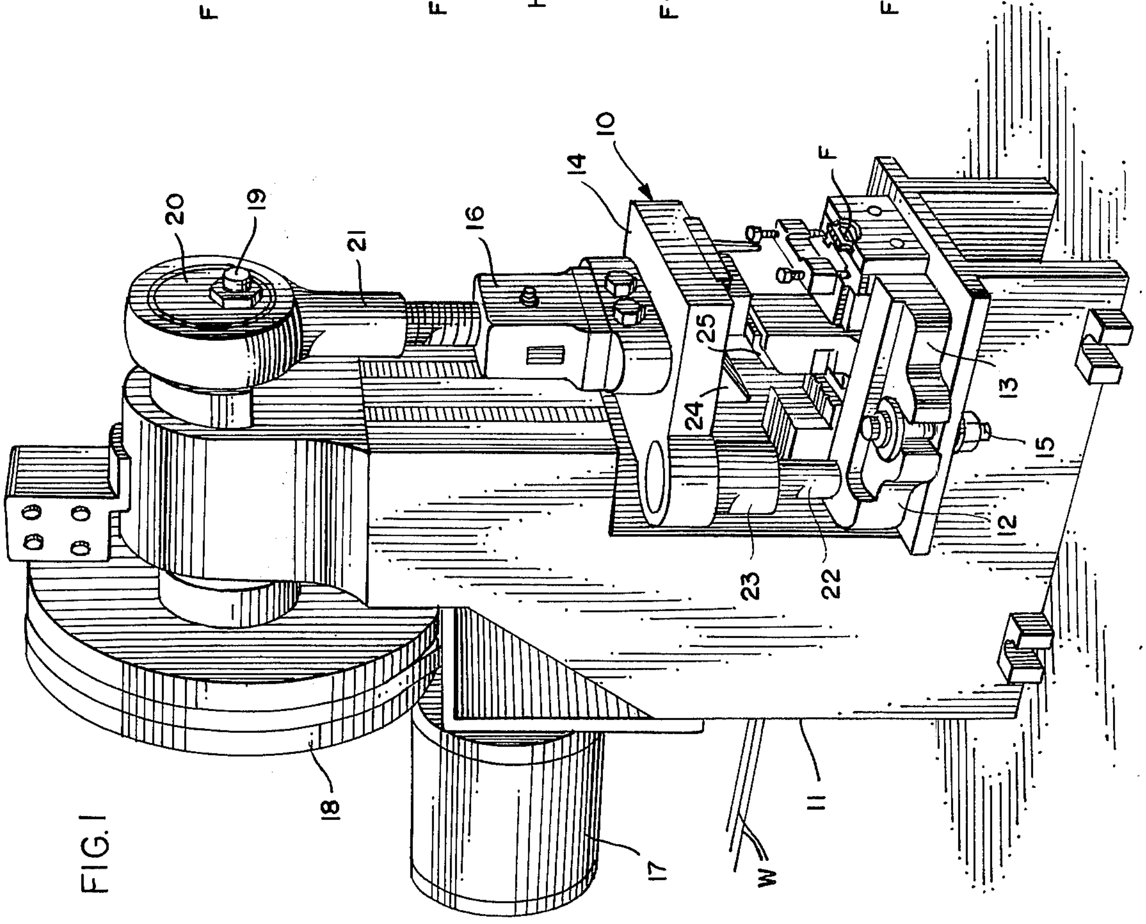
Figure 3:
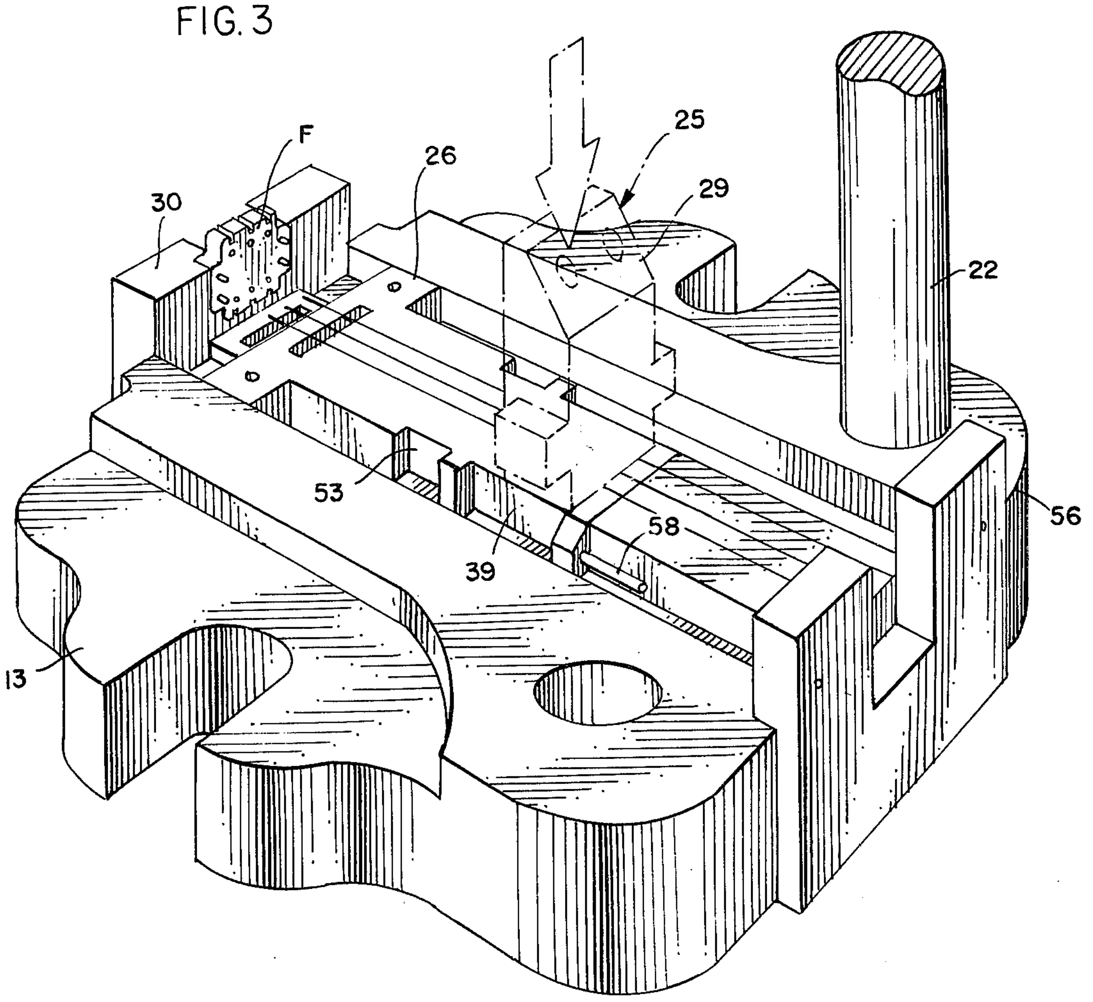
FIG. 3 is a fragmentary perspective view of a portion of the apparatus of FIG. 1 and which illustrates in greater detail the particulars of the first step of the method illustrated schematically in FIG. 2.
Figure 6:
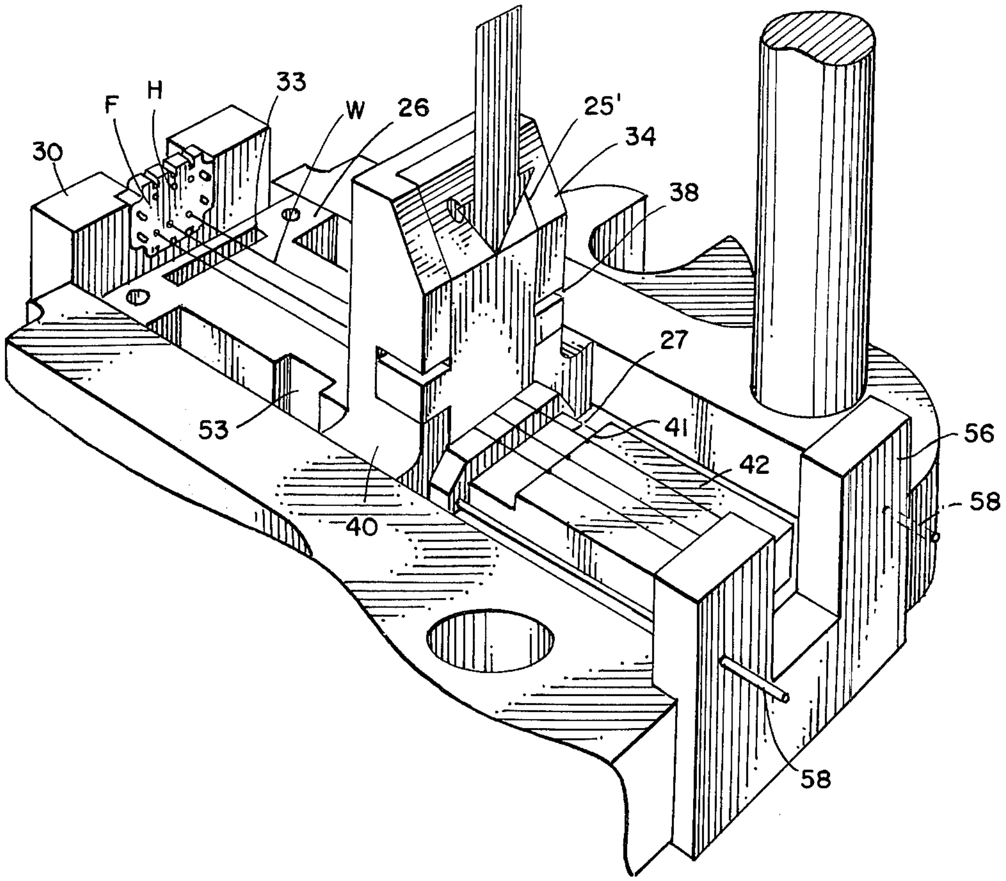
FIG. 6 is a view similar to FIG. 3, i.e., a fragmentary perspective view of a portion of the apparatus of FIG. 1 and which illustrates the second step of the method schematically represented in FIG. 2.
Figure 9:
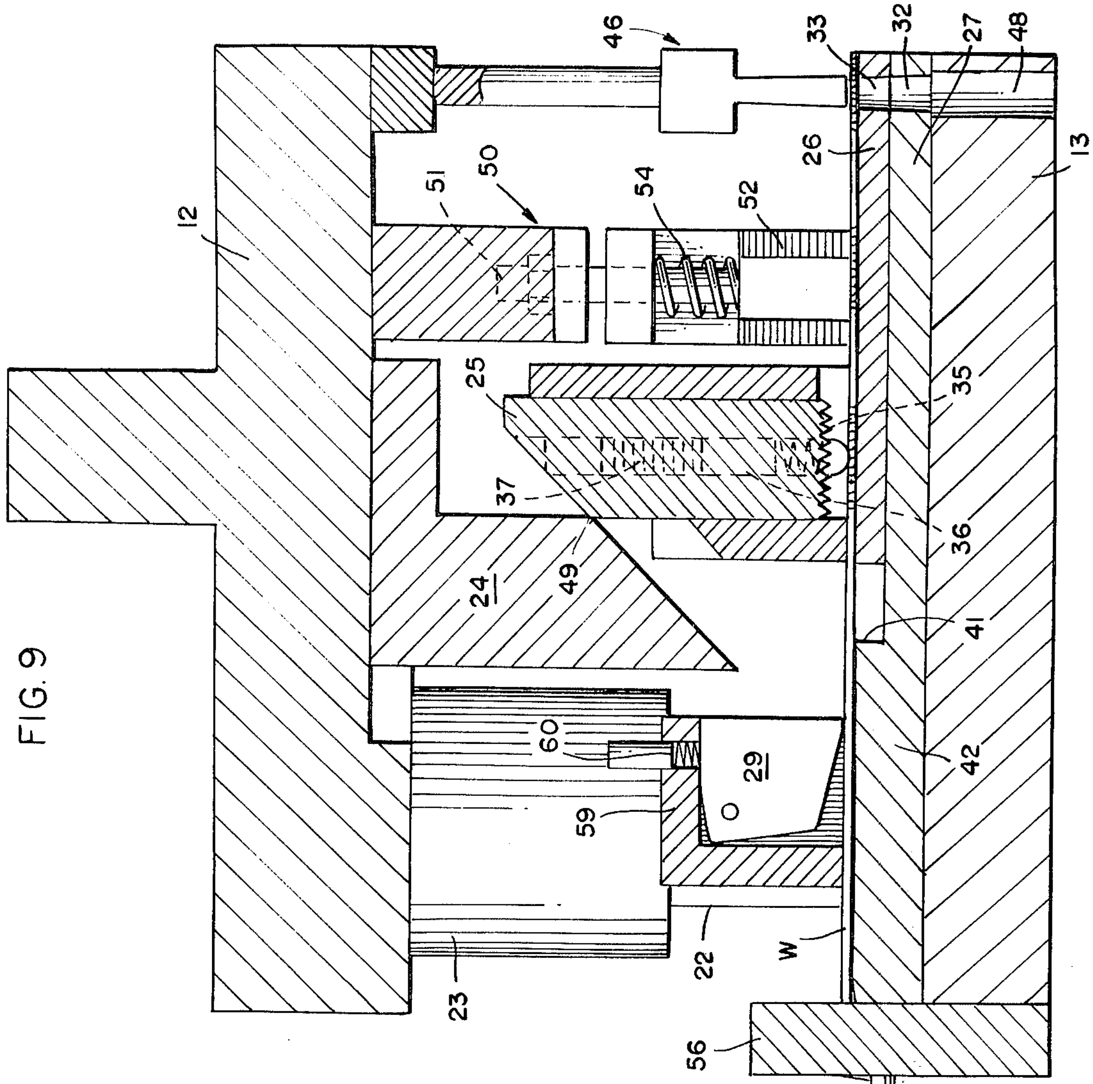
Figure 9:
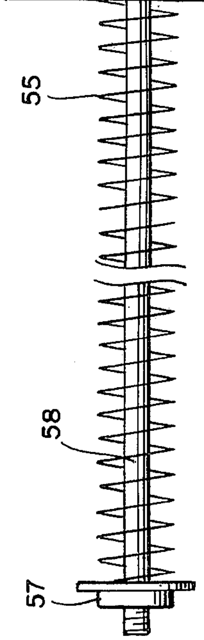
Figure 8:
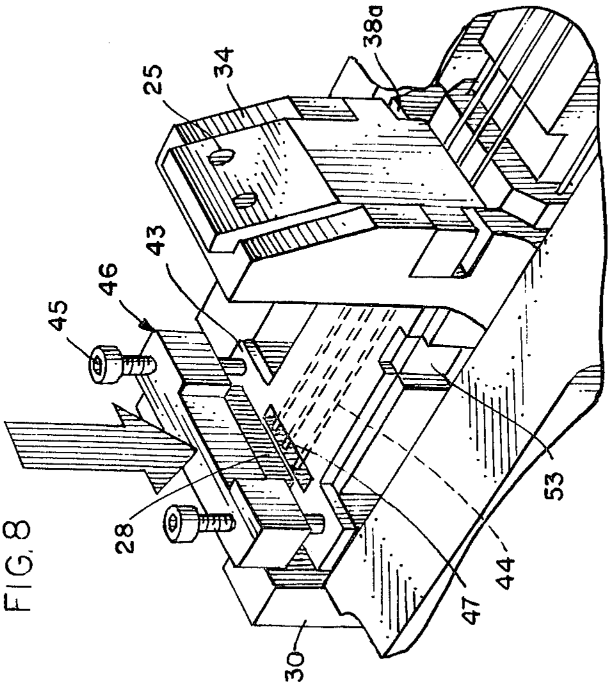

FIG. 8 is yet another fragmentary perspective view of the apparatus of FIGS. 3 and 6, but showing the orientation of the elements thereof as they exist at the time of the third step of the method schematically illustrated in FIG. 2; and FIG. 9 is a fragmentary sectional view of the wire handling portion of the apparatus of FIG. 1 and corresponds essentially to the showing of the apparatus in FIG. 6.

Referring first to FIG. 1, the numeral 10 designates generally a wire inserting apparatus which is operated by a punch-press 11. The wire inserting apparatus includes a frame 12 which includes a base block 13 and an upper block 14 which is reciprocably mounted on the base block 13. The base block is bolted to the frame 12 by bolts 15 and the upper block 14 is bolted to the ram 16 of the punch press 11.

It will be appreciated that a variety of prime movers can be employed in developing the reciprocatory action to be described in greater detail hereinafter. One suitable device is the press 11 which is normally powered by a motor 17 operatively associated with the press 11. A drive 18 (which may be a belt and pulley arrangement) transmits rotational power from the motor 17 to the shaft 19. The shaft 19 is eccentrically related (by means of the eccentric 20) to the connecting rod 21 which serves as the ram 16 and thus reciprocates the upper block 14. The upper block 14 is guided relative to the lower block 13 by means of a post and collar arrangement — the lower block 13 being equipped with posts 22 and the upper block 14 being equipped with collars 23.

The upper block carries a wedge or camming element 24 which is engageable with a mating camming element generally designated 25 operably associated with and carried by the lower block 13. The coaction of the camming elements 24 and 25 serves to advance the wires W (see the left hand side of FIG. 1) into the fitting F (see the right hand side of FIG. 1).

GENERAL DESCRIPTION OF METHOD

Figure 4:
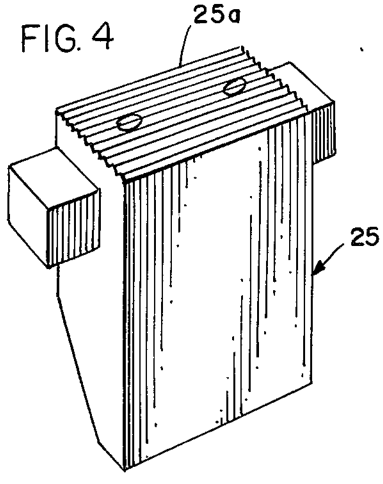
FIG. 4 is an inverted perspective view of the knurling or wire-deforming element shown in phantom line in FIG. 3.

Reference is now made to FIG. 2 wherein one of the wires W is about to be inserted into the fitting F. The wire W is seen to be supported on a carriage 26 which in turn is supported and guided by a track 27. The first step in the method is to slightly deform the wire W as by knurling, and this is schematically represented in FIG. 2. A preferred means for doing this is illustrated in FIGS. 3 and 4 wherein the lower camming element 25 is seen to have a serrated under surface as at **25*a* (see particularly FIG. 4). Thus, as the lower camming element 25 is depressed by the action of the upper camming element 24**, it stakes or otherwise scribes the wire as illustrated in exaggerated form in FIG. 2.

The next step in the inventive procedure is to advance the carriage 26 (and hence the wire W) into inserting relationship relative to the fitting F — and this is illustrated schematically in the second from the top stage of the schematic representation of FIG. 2. A previously knurled portion K is seen to be received within the fitting F so as to achieve a firm and reliable anchor. During the advancing portion of the method, the lower camming element 25 is maintained in its depressed mode so as to afford complete control over the wire W. This is illustrated in FIG. 6 where the lower camming element is designated by the numeral 25' and is seen to be moved slightly to the left from its showing in FIG. 3.

The next stage of the method, as illustrated in FIG. 2 is a cutoff of the wire W by the punch 28, this occurring adjacent a subsequent knurled portion K'. This is illustrated relative to the preferred embodiment in FIG. 8.

The last stage of the method is a retraction of the carriage 26 while maintaining the wire W in its previously advanced position, the restriction of the wire W being achieved by means of dogs 29 (see the lower left hand portion of FIG. 9) which are mounted to permit passage of the wire W in one direction but not the other.

Figure 7:
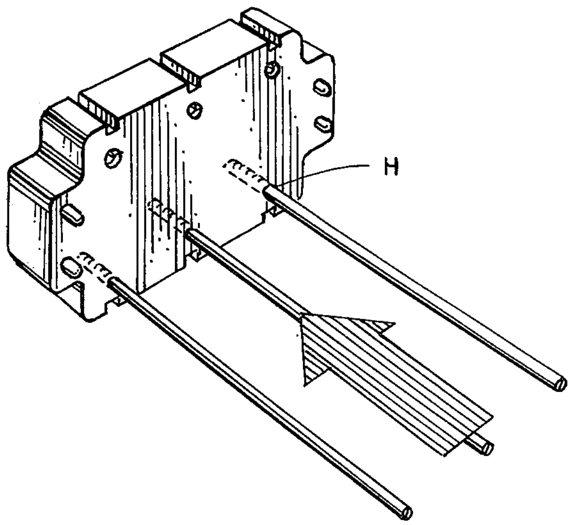
FIG. 7 is a fragmentary perspective view showing the positions of the wires as they exist with the apparatus oriented as it is in FIG. 6.

Thus, according to the invention, a unitary molded plastic form is positioned at one end of a path wherein the wire travels, i.e., on the carriage 26. The fitting has at least one elongated hole therein which extends in a direction parallel to the path — see particularly FIG. 7. A portion of the wire W in the path is knurled or otherwise upset by depression of the lower camming element 25 afterwhich further force on the camming surface 29 of the lower camming element 25 (see FIG. 3) causes advancement of the carriage 26 and hence the wire W into one of the holes (see FIG. 7). Advantageously, the wire is of a nominal diameter of 0.100 inch (approximately 2.5 millimeters). The hole H is approximately the same size, with a tolerance of up to about 0.002 inch (approximately 0.05 millimeters). The slight knurling therefore serves to anchor the wire in the hole. After the wire W is in the hole H (see FIG. 2), the wire is severed as by punching via the punch 28 and at a spaced distance from the hole H to provide the electrical lead L (see the bottom portions of FIG. 2). Thereafter, the carriage 26 is retracted without retraction of the wire W.

By the slight knurling, which is of the order of at least about 0.0005 inch (approximately 0.0125 millimeters), there is sufficient interference between the wire and the walls of the hole to withstand a withdrawal force of the order of about 3 pounds (approximately 1.35 kilograms).

It will be seen that the wire W is continuous and is intermittently advanced in the path, the wire being gripped in the knurled portion thereof for advancing the wire. Thus, several knurled positions exist at any given time due to the spacing of the lower camming element 25 from the fitting F.

DETAILED DESCRIPTION OF APPARATUS

Referring now to FIG. 3, a larger perspective view of the lower portion of the wire handling apparatus is seen. Again, the lower block is designated by the numeral 13 and it will be appreciated that the showing in FIG. 3 is of the opposite side from that seen in FIG. 1, the posts 22 being on the right hand side in FIG. 3 as contrasted to the left hand side in FIG. 1. Thus, in inserting a wire into the fitting F, the carriage 26 moves to the left in FIG. 3 while the advancing, inserting movement in FIG. 1 is to the right. Fixed to the left hand end of the block 13 (still referring to FIG. 3) is a fixture 30 for supporting the fitting 30 — and with the holes H aligned so that the various wires W are in line therewith. In the illustration given in FIG. 6, for example, the fitting F has six holes so that after three wire leads are inserted (as illustrated in FIG. 6), the fitting F is removed and reinserted in reverse fashion so as to provide wire leads for the remaining three holes.

Figure 5:
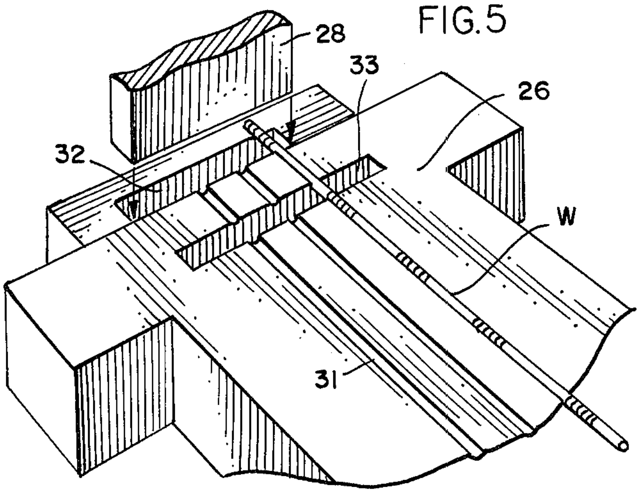
FIG. 5 is a fragmentary perspective view showing the position of the wires as they exist at the beginning of an installing cycle.

Referring again to FIG. 3, the heavy arrow at the upper central portion of the view indicates the fact that force has just been applied by the upper camming element 24 (designated to FIGS. 1 and 6). This causes the lower camming element 25 to be depressed and into engagement with the wires W, knurling the same by virtue of the grooved bottom 25*a* (see FIG. 4). At this particular stage, the wire W is oriented as seen in FIG. 5. In FIG. 5, the carriage 26 is again seen to have three grooves or ways as at 31 for supporting the wires W. However, a wire is shown only in the extreme right hand way and this wire is seen to project beyond the end of the carriage 26 — analogous to that seen in the uppermost portion of FIG. 2. This is resulted from the severance of a preceding segment of with by virtue of the punch 28 which is aligned with an opening 32 in the track 27.

Now referring to FIG. 6, it will be noted that the heavy arrow therein is directed to a point lower down on the camming surface of the lower camming member 25. The continued application of the force from the upper camming element 24 (as designated by the heavy arrow) has resulted in the carriage 26 moving to the left (compare FIGS. 3 and 6). This causes the wires W to be inserted within the aligned holes W and at the end of the carriage travel, the opening 33 in the carriage 26 is aligned with the opening 32 in the track 27. Thus, the apparatus is in condition for the severance step.

The lower camming element 25, as can be seen from comparing FIGS. 6 and 8, is slidably mounted within a bracket 34. In the FIG. 8 depiction, there no longer is any downward force applied to the lower camming element 25 and the element 25 is in its upper position — being urged by virtue of springs 35 acting against stops 36 held in place by means of studs 37 (see FIG. 9). Thus, the FIG. 8 showing of the condition of the lower camming element 25 corresponds to that at the begining of a cycle, i.e., just before vertical force is applied thereto by the upper camming element 24. The initial force applied by the upper camming element 24 depresses the lower camming element 25 in the fashion indicated in FIG. 3 and further application of downward force from the upper camming element 24 causes the lower camming element — and hence, the carriage 26 — to move to the left, as seen in FIG. 6. The holder 34 supports the camming element 25 for this vertical movement a gap 38 being so designated in FIG. 6 illustrating the extent of the downward movement of the lower camming element 25 relative to the holder 34. The corresponding gap 38*a* is seen in FIG. 8 when the lower camming element is urged upwardly by virtue of the action of the springs 35.

The holder 34 is coupled to the carriage 26 by virtue of being inserted into notches 39 (see FIG. 3) in the side of the carriage 26. For this purpose, the holder 34 is equipped with leg portions as at 40 (see FIG. 6) which are received within the notches 39. Thus, as the lower camming element 25 is moved to the left, i.e., advanced, under the urging of the upper camming element 24, this force in turn is transmitted through the holder 34 to the carriage 26. Omitted for the sake of clarity are gibs which overlay the leg portions 40 restraining the holder 34 from moving vertically.

As the assembly of the lower camming element 25, the holder 34, and the carriage 26 moves to the left, it is supported on and guided by the track 27. The track 27 is stepped as at 41 (see FIG. 6), providing a way-equipped portion as at 42 which underlies the restraining dogs 29 (see FIG. 9). The track 42 is fixed to the block 13 and does not move during the cycle of wire knurling, insertion, cutoff and carriage retraction.

Shown only in FIG. 8 is a cover 43 for that portion of the carriage 26 to the left of the holder 34. The cover 43 overlies the "downstream" portion of the carriage 26 and is equippped with grooves or ways 44 aligned with the ways 31, thereby confining the wires W. The cover 43 is secured in position on the carriage 26 by means of the same securing bolts 45 (still referring to FIG. 8), which supports the punch assembly thereon.

The punch assembly, generally designated 46, consists of a bracket which is slidable on the bolts 45 against the urging of compression springs (not shown). The bracket 46 carries the punch 28 which passes through a generally rectangular opening 47 in the cover 43 and through the shearing opening 33 in the carriage 26.

The opening 32 in the track 27 provides an exit for the portions of the wire removed by the punching operation. As can be seen in FIG. 9, this communicates with a passage 48 in the base block 13 so as to permit the punched portions to be collected and removed from the apparatus. By punching a discrete segment of the wire incident to severance (as contrasted to a knifelike shear) I avoid any substantial distortion of the wire, particularly in the free end as at K in the upper portion of FIG. 2.

During the punching operation, the carriage 26 is immobilized both by the action of the upper camming element 24 (see FIG. 9 where the forward vertical face thereof abuts the rear face of the lower camming element 25 as at 49) and by the inner position of a ram-actuated lock assembly generally designated 50. The assembly 50 includes a bolt 51 which is carried by the upper block 12 and carries at its lower end a latch 52 which, when the carriage is at its most advanced position enters into a locking notch 53 (see FIGS. 3, 6 and 8). When the ram 16 is moved upwardly, taking with it the upper block 12, the latch 52 is also raised upwardly, compressing the spring 54 (see FIG. 9). The action of the spring 54 tends to snap the latch 52 into the notch 53 thereby positively positioning the carriage for the punching operation.

Upon retraction of the ram 16 and the withdrawal of the latch 52 from the notch 53, and also the disengagement of the camming element 24 and 25, compression springs 55 (seen only in FIG. 9), cause the retraction of the carriage 26. More particularly, each compression spring is positioned between a stop 56 (designated in FIGS. 3, 6 and 9) and a stop nut 57 mounted on a threaded rod 58. Each threaded rod 58 extends along side the grooved track portion 42 (see FIG. 6) and into the upstream end of the carriage 26 (see particularly FIG. 6). However, when the carriage 26 is retracted under the urging of the springs 55, the dogs 29 which are mounted within a block 59 (see FIG. 9) are urged downwardly by virtue of spring 60 to engage the wires W and cause the same from returning with the carriage 26. Thus, the apparatus is returned for another cycle of operation, started by a subsequent downward movement of the ram 16.

It will be appreciated that during the operation the wire W is intact until it is firmly seated in the hole H of the fitting F and is urged into seating engagement, i.e., advanced, by the action of the very element (the knurled-bottomed lower camming element 25) which has developed the upsetting or knurling. Therefore, in one cycle, a continuous wire is knurled under controlled conditions and during the same cycle advanced, seated and transversely severed.

I claim:

1. In a method of making an electrical fitting, the steps of positioning a unitary molded plastic form at one end of a path, said form having at least one elongated hole therein extending in the direction of said path, sequentially knurling longitudinally spaced portions of a continuous wire in said path and intermittently gripping the knurled portion thereof and thereafter advancing said wire in said path into said hole to position a previously knurled portion in said hole, the wire diameter prior to knurling approximating the diameter of said hole whereby said knurled portion is adapted to anchor said wire in said hole, and severing said wire a spaced distance from said hole to provide an electrical lead.

2. The product made according to the method of claim 1 in which said knurled portion includes indentations in said wire at at least about 0.005 inch (0.0125 millimeters) whereby said wire is sufficiently anchored in said form to withstand a withdrawal force of three pounds (1.35 kg.).

* * * * *